(12) United States Patent
Levine

(10) Patent No.: US 9,799,008 B2
(45) Date of Patent: Oct. 24, 2017

(54) APPLYING ORDERED MODIFICATIONS TO RECURRING EVENT INSTANCES

(75) Inventor: Brian Levine, Chelmsford, MA (US)

(73) Assignee: International Business Machines Corporation, Armonk, NY (US)

( * ) Notice: Subject to any disclaimer, the term of this patent is extended or adjusted under 35 U.S.C. 154(b) by 2357 days.

(21) Appl. No.: 10/789,331

(22) Filed: Feb. 27, 2004

(65) Prior Publication Data

US 2005/0192857 A1    Sep. 1, 2005

(51) Int. Cl.
*G06Q 10/00* (2012.01)
*G06Q 10/10* (2012.01)

(52) U.S. Cl.
CPC ....... *G06Q 10/109* (2013.01); *G06Q 10/1093* (2013.01)

(58) Field of Classification Search
CPC .......... G06Q 10/06314; G06Q 10/1093; Y10S 715/963
See application file for complete search history.

(56) References Cited

U.S. PATENT DOCUMENTS

| | | | |
|---|---|---|---|
| 4,942,527 A * | 7/1990 | Schumacher | 705/9 |
| 5,813,013 A * | 9/1998 | Shakib | G06Q 10/109 |
| 5,893,073 A * | 4/1999 | Kasso et al. | 705/8 |
| 6,272,074 B1 * | 8/2001 | Winner | 368/10 |
| 6,360,217 B1 * | 3/2002 | Gopal et al. | |
| 6,446,136 B1 * | 9/2002 | Pohlmann | G06F 11/3006 707/999.104 |
| 6,594,637 B1 * | 7/2003 | Furukawa et al. | 705/9 |
| 6,901,413 B1 * | 5/2005 | Wu | G06F 9/52 707/692 |
| 7,016,909 B2 * | 3/2006 | Chan | G06Q 10/06314 |
| 7,209,911 B2 * | 4/2007 | Boothby | G06F 17/30575 |
| 7,440,961 B1 * | 10/2008 | Matousek | |
| 2003/0061433 A1 * | 3/2003 | Hall et al. | 711/1 |
| 2003/0131073 A1 * | 7/2003 | Lucovsky | G06F 21/335 709/219 |

(Continued)

OTHER PUBLICATIONS 4.8.4.4 Recurrence ID, RFC 2445 iCalendar Specification (Nov. 1998), accessed at: https://web.archive.org/web/20031205235712/http://kanzaki.com/docs/ical/recurrenceId.html.*

(Continued)

*Primary Examiner* — Tiphany Dickerson
(74) *Attorney, Agent, or Firm* — Steven M. Greenberg, Esq.; CRGO Law

(57) ABSTRACT

A method and system for the ordered modification of a recurring event in a calendaring application. A method for applying ordered modifications to recurring event instances, can include identifying an event exception which corresponds to a separately defined recurring event instance. Subsequently, at least one property of the recurring instance can be modified based upon the event exception. Additional event exceptions corresponding to the recurring event instance can be further identified in accordance with a preferred aspect of the present invention. For each further identified additional event exception, at least one property of the recurring event instance can be further modified based upon the further identified additional event exception. Notably, each of the identifying and modifying steps can be repeated for additional recurring event instances.

12 Claims, 2 Drawing Sheets

(56) References Cited

U.S. PATENT DOCUMENTS

2006/0020889 A1\*    1/2006   Coppinger et al. ........... 715/710

OTHER PUBLICATIONS

Dawson, Frank, and Derik Stenerson. Internet calendaring and scheduling core object specification (icalendar). No. RFC 2445. 1998.\*

Fowler, M., "Recurring Events for Calendars" (Sep. 2000) accessed at: http://martinfowler.com/apsupp/recurring.pdf.\*

"Specifying Exceptions to Recurring Appointments and Meetings" (Sep. 2003) Microsoft Exchange Server.\*

\* cited by examiner

APPLYING ORDERED MODIFICATIONS TO RECURRING EVENT INSTANCES

BACKGROUND OF THE INVENTION

Statement of the Technical Field

The present invention relates to calendaring systems and more particularly to scheduling recurring events in calendaring systems.

Description of the Related Art

Calendaring systems have formed the core component of personal information management software and firmware applications for decades. Initially, a mere calendar display, modern calendaring systems provide scheduling and alarm functions in addition to full integration with contact management, time entry, billing and project management applications. The typical calendaring application minimally provides a mechanism for scheduling an event to occur on a certain date at a certain time. Generally, the event can be associated with a textual description of the event. More advanced implementations also permit the association of the scheduled event with a particular contact, a particular project, or both. Furthermore, most calendar applications provide functionality for setting an alarm prior to the occurrence of the event, as well as archival features.

One important feature of the calendaring system includes the ability to schedule a recurring event without requiring the end user to individually set an event on each recurring date. For example, where a meeting is to occur every week on a particular time over the course of several months, the end user can schedule the event as recurring every week at the particular time for the course of the several months. The calendaring system, in turn, can schedule each event in an automated fashion based upon the recurring information. Advantageously, the end user subsequently can modify any one of the recurring events, or the end user can apply a single modification to all of the recurring events responsive to which the calendaring system can apply the single modification to all of the recurring events in an automated fashion.

In recent years, computing has changed from a centralized model to a distributed model. Vast computer communications networks now couple together select users across the enterprise. Leveraging the wide reach of the modern enterprise, calendaring systems can incorporate multiple users and the events scheduled by multiple users. In particular, "groupware" oriented calendaring systems can permit one user to view and schedule events of other, remotely positioned users. To further provide interoperability between different types of calendaring systems, entire specifications have been developed to accommodate the distributed and disparate nature of the calendaring world. RFC2445 entitled "The Internet Calendaring and Scheduling Core Object Specification (iCalendar)" represents one such effort.

Notably, distributed and interoperable calendaring systems, like their stand-alone progeny, support the establishment of recurring events without requiring the end user to set each individual recurring event manually. Yet, more recent calendaring implementations no longer simply automate the process of setting multiple events specified by as recurring in nature. Rather, to conserve storage space, recurring events can be stored as a single event described as recurring in nature. More particularly, in order to optimize for space, the storage model employed by advanced calendaring systems stores only the event data and the recurrence rule. The actual event instances can be calculated dynamically when a request is processed to retrieve events within a certain date range.

Importantly, modification to a recurring event can be applied universally, to single instances of the recurring event, to past instances of a recurring event, or to all future recurring events. As described in RFC2445, however, the modification of the recurring event can be applied internally to the recurring event. Specifically, the recurrence rule defined within the recurring event, itself, can include the modifications to the recurrence rule. Interpreting and applying a modification to a recurrence rule in the conventional model, however, can be difficult and problematic for the uninitiated. Accordingly, it would be preferable to incorporate a simplified system, method and apparatus for applying modifications to recurring events in a calendaring system.

SUMMARY OF THE INVENTION

The present invention addresses the deficiencies of the art in respect to modifying recurring event instances in a calendaring application and provides a novel and non-obvious method, system and apparatus for the ordered modification of a recurring event in a calendaring application. A method for applying ordered modifications to recurring event instances, can include identifying an event exception which corresponds to a separately defined recurring event instance. Subsequently, at least one property of the recurring event instance can be modified based upon the event exception.

Additional event exceptions corresponding to the recurring event instance can be further identified in accordance with a preferred aspect of the present invention. For each further identified additional event exception, at least one property of the recurring event instance can be further modified based upon the further identified additional event exception. Notably, each of the identifying and modifying steps can be repeated for additional recurring event instances.

Event exceptions relating to the recurring event instance which have become stale also can be identified in accordance with the inventive arrangements. Once identified, the stale event exceptions can be purged. More specifically, event exceptions can be identified whose specified modifications to event properties in the recurring event instance have been obviated by modifications specified in subsequently defined event exceptions.

The present invention can be disposed in or associated with a calendaring system. A calendaring system which has been configured in accordance with the present invention can include a recurrence event expander and a recurrence event modifier coupled to the recurrence event expander. In a preferred embodiment, a modification rule reducer also can be included in the calendaring system. Notably, the calendaring system can implement an iCalendar as specified in RFC 2445.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein.

DETAILED DESCRIPTION OF THE PREFERRED EMBODIMENTS

The present invention is a system, method and apparatus for applying ordered modifications to recurring event instances. In accordance with the present invention, an event storage model can include event data and a corresponding recurrence rule for each recurring event. Actual event instances can be calculated on demand based upon the recurrence rule. Notably, modifications to the event instances can be specified separately for specific event properties in the event instance. Only the modified properties can be stored as an "event exception." In this way, modifications to the event instances can be calculated concurrently with the dynamic calculation of the event instances based upon the recurrence rule. Finally, stale event exceptions which have become obviated by the application of subsequent event exceptions can be purged from the storage model periodically.

Figure 1:
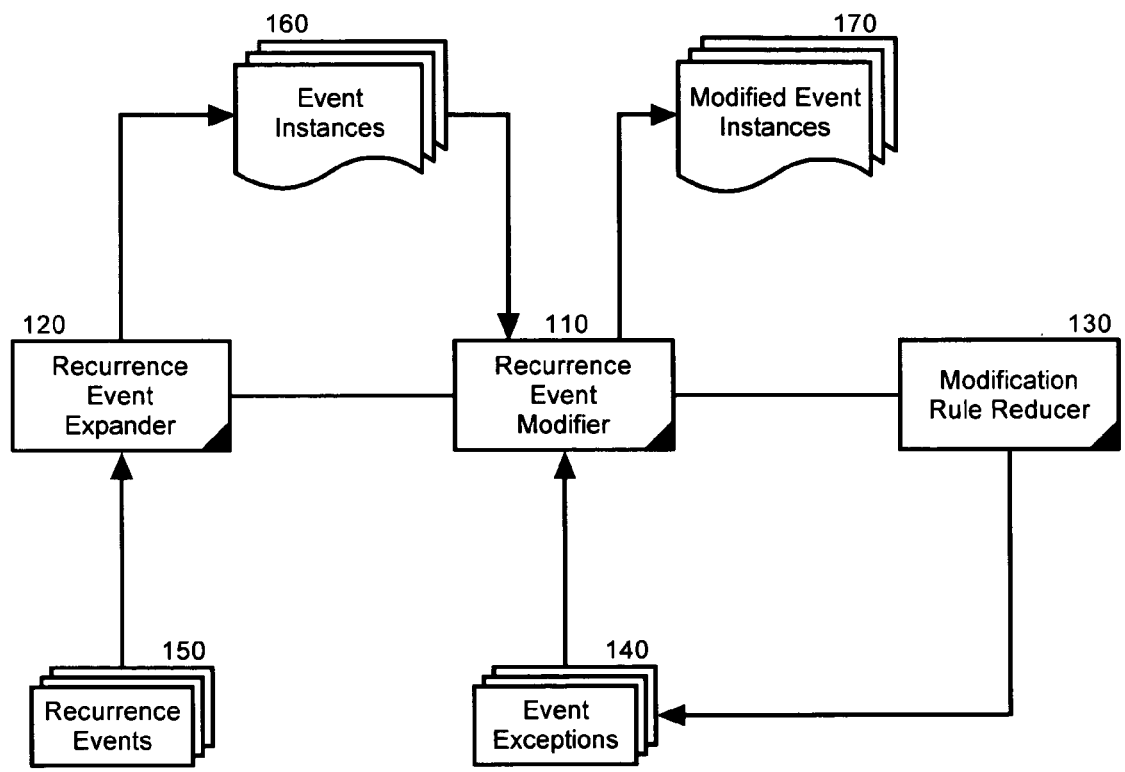
FIG. 1 is a schematic illustration of a system for applying ordered modifications to recurring event instances; and, FIG. 2 is a flow chart illustrating a process for applying ordered modifications to recurring event instances.

In further illustration of the preferred aspects of the present invention, FIG. 1 is a schematic illustration of a system for applying ordered modifications to recurring event instances. The system can include a recurrence event expander 120 disposed within a calendaring system (not shown). The recurrence event expander 120 can be programmed to expand recurrence events 150 into event instances 160 based upon the properties specified within the recurrence events 150.

Notably, a recurrence event modifier 110 can be coupled to the recurrence event expander 120. The recurrence event modifier 110 can modify properties within the event instances 160 based upon event exceptions 140 defined for respective ones of the event instances 160. Based upon the modifications to the properties within the event instances 160, modified event instances 170 can be produced. In a preferred aspect of the present invention, each event exception can include the following data:
1. A reference to the recurring event instance that is to be modified;
2. A flag indicating which properties have been modified;
3. An entry for each modified property;
4. A date stamp that indicates when the modification was created; and,
5. A range flag that indicates whether the modification is to be applied only to the referenced instance, to the referenced instance and all subsequent instances, or to the reference instance and all previous instances.

It will be recognized by the skilled artisan that over time, modifications to event instance properties reflected in the event exceptions 140 can become stale based upon the modifications to the same event instance properties reflected in subsequent ones of the event exceptions 140. To further optimize the storage space consumed by the event exceptions 140, a modification rule reducer 130 can be coupled to the recurrence event modifier 110. The modification rule reducer 130 can inspect older ones of the event exceptions 140 to detect stale event exceptions. For example, the modification rule reducer 130 can build a list of event properties modified by different event exceptions 140. Only the most recent ones of the event exceptions 140 can be maintained while others can be purged.

Figure 2:
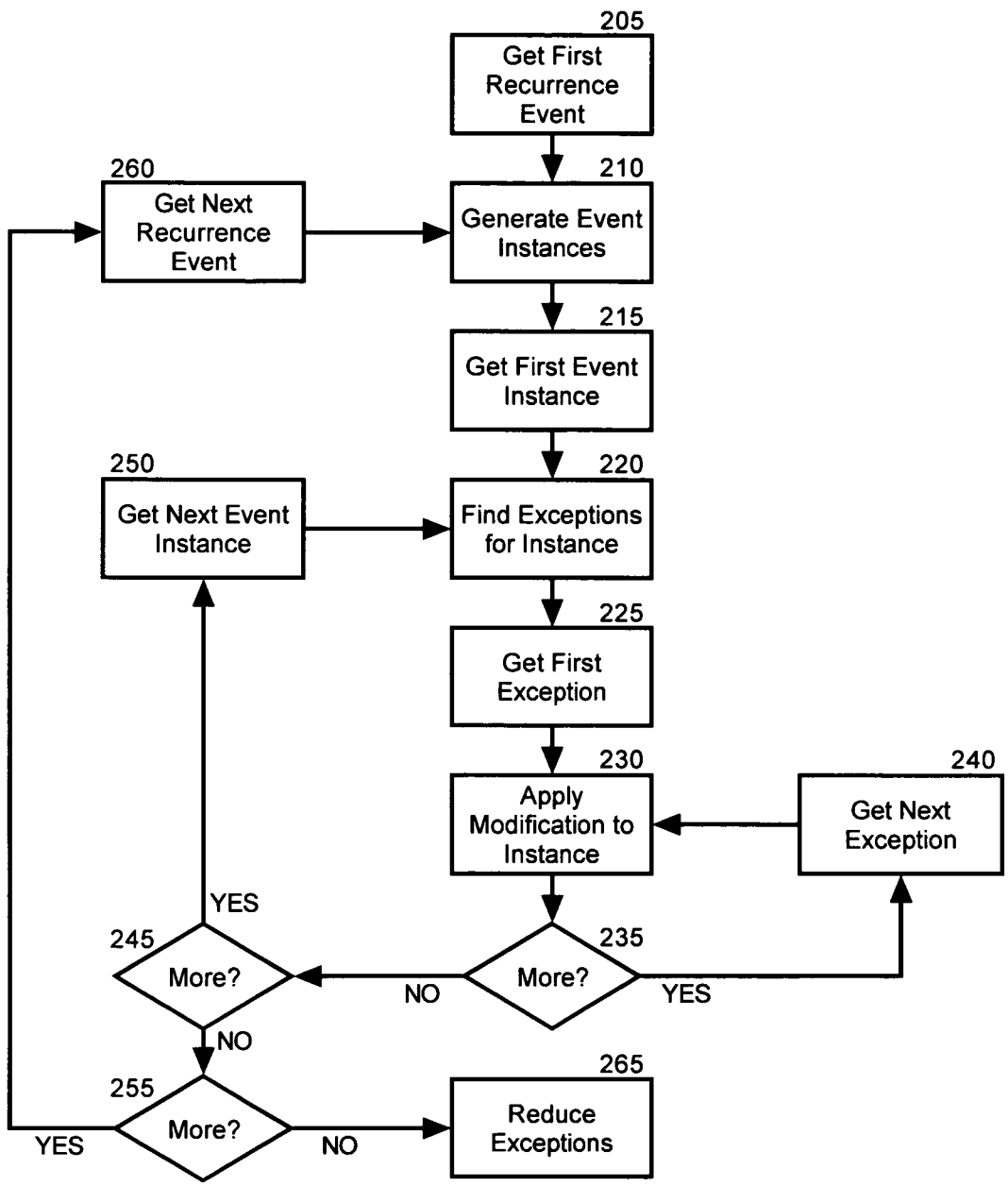

The process of modifying event instances in accordance with the present invention is shown in the flow chart of FIG. 2. Beginning in block 205, a first recurrence event can be retrieved. In block 210, one or more event instances can be generated from the recurrence event. In block 215, a first generated event instance can be retrieved for processing. Subsequently, in block 220 event exceptions for the first generated event instance can be identified. In block 225, a first one of the identified event exceptions can be retrieved for processing. Finally, in block 230, one or more modifications to a property or properties in the event instance specified in the event exception can be applied to the event instance.

In decision block 235, it can be determined whether additional event exceptions have been identified for the first generated event instance. If so, in block 240, a next identified event exception can be retrieved for processing. Once retrieved, any modifications to a property or properties in the event instance specified in the event exception can be applied to the event instance. Subsequently, the process can repeat in blocks 235 and 240 for each remaining event exception identified for the first generated event instance. When complete, in block 245, it can be determined whether additional event instances remain to be processed. If so, the process can continue through block 250.

In block 250, the next generated event instance can be retrieved for processing. Subsequently, exceptions for the next generated event instance can be located and applied in blocks 220 through 245. The foregoing process can be repeated for each generated instance based upon the first recurrence event. In block 245, when no more event instances remain to be processed, in decision block 255 it can be determined whether additional recurrence events remain to be processed. If so, in block 260 the next recurrence event can be retrieved, event instances can be generated for the next recurrence event and the process of blocks 210 through 260 can repeat. Once no more recurrence events remain to be processed, the event exceptions can be reduced 265 by purging stale event exceptions.

The present invention can be realized in hardware, software, or a combination of hardware and software. For example, the data handling policy can be stored in a database. An implementation of the method and system of the present invention can be realized in a centralized fashion in one computer system, or in a distributed fashion where different elements are spread across several interconnected computer systems. Any kind of computer system, or other apparatus adapted for carrying out the methods described herein, is suited to perform the functions described herein. For example, the data handling policy can be stored in a database.

A typical combination of hardware and software could be a general purpose computer system having a central processing unit and a computer program stored on a storage medium that, when loaded and executed, controls the computer system such that it carries out the methods described herein. The present invention can also be embedded in a computer program product, which comprises all the features enabling the implementation of the methods described herein, and which, when loaded in a computer system is able to carry out these methods. Storage medium refers to any volatile or non-volatile storage device.

Computer program or application in the present context means any expression, in any language, code or notation, of a set of instructions intended to cause a system having an information processing capability to perform a particular function either directly or after either or both of the following a) conversion to another language, code or notation; b) reproduction in a different material form. Significantly, this invention can be embodied in other specific forms without departing from the spirit or essential attributes thereof, and accordingly, reference should be had to the following claims, rather than to the foregoing specification, as indicating the scope of the invention.

I claim:

1. A method for applying ordered modifications to recurring event instances, the method comprising the steps of:
   calculating on demand in a calendaring system executing in memory by a processor of a computer one or more event instances for a recurring event based on a recurrence rule;
   specifying separately from the one or more event instances specific event properties as modifications to the one or more event instances and storing only the modified properties as an exception to the one or more event instances;
   concurrently applying said modifications to the one or more event instances when calculating on demand one or more event instances for the recurring event based on the recurrence rule, each event exception including a reference to an event instance of the one or more event instances to be modified, a flag indicating which properties have been modified, an entry for each property that has been modified, a date stamp indicating when a modification was created, and a range flag indicating which event instance the modification applies;
   identifying one or more event exceptions which have become stale when modifications specified by said one or more event exceptions have been obviated by modifications specified in one or more subsequently defined event exceptions; and,
   purging said identified one or more event exceptions.

2. The method of claim 1, further comprising the steps of:
   identifying an event exception from the one or more event exceptions, the event exception corresponding to an event instance of the one or more event instances;
   modifying at least one property of said event instance based upon said identified event exception;
   further identifying an additional event exception from the one or more event exceptions, the additional event exception corresponding to said event instance; and,
   for the identified additional event exception, further modifying at least one property of said event instance based upon the further identified additional event exceptions.

3. The method of claim 2, further comprising the step of repeating said identifying and modifying steps for additional ones of the event instances.

4. The method of claim 1, wherein the range flag indicating which event instance the modification applies indicates whether the modification applies to one of only the event instance of the one or more event instances, the event instance of the one or more event instances and all subsequent event instances, and the event instance of the one or more event instances and all previous event instances.

5. A calendaring system comprising:
   a computer with processor and memory;
   a recurrence event expander configured for calculating on demand one or more event instances for a recurring event based on a recurrence rule; and,
   a recurrence event coupled to said recurrence event expander and configured for specifying separately from the one or more event instances specific event properties as modifications to the one or more event instances and storing only the modified properties as an exception to the one or more event instances, concurrently applying the modifications to the one or more event instances when calculating on demand one or more event instances for the recurring event based on the recurrence rule, each event exception defined for one of the one or more event instances and separately stored from the one or more event instances, each event exception including a reference to an event instance of the one or more event instances to be modified, a flag indicating which properties have been modified, an entry for each property that has been modified, a date stamp indicating when a modification was created, and a range flag indicating which event instance the modification applies, identifying one or more event exceptions which have become stale when modifications specified by said one or more event exceptions have been obviated by modifications specified in one or more subsequently defined event exceptions and purging said identified one or more event exceptions.

6. The system of claim 5, further comprising a modification rule reducer coupled to the recurrence event modifier, the modification rule reducer inspecting older ones of the one or more event exceptions to detect stale one or more event exceptions.

7. The system of claim 5, wherein the calendaring system implements an iCalendar.

8. The system of claim 5, wherein the range flag indicating which event instance the modification applies indicates whether the modification applies to one of only the event instance of the one or more event instances, the event instance of the one or more event instances and all subsequent event instances, and the event instance of the one or more event instances and all previous event instances.

9. A non-transitory machine readable storage medium having stored thereon a computer program for applying ordered modifications to recurring event instances, the computer program comprising a routine set of instructions which when executed by a machine cause the machine to perform the steps of:
   calculating on demand in a calendaring system executing in memory by a processor of a computer one or more event instances for a recurring event based on a recurrence rule;
   specifying separately from the one or more event instances specific event properties as modifications to the one or more event instances and storing only the modified properties as an exception to the one or more event instances;
   concurrently applying said modifications to the one or more event instances when calculating on demand one or more event instances for the recurring event based on the recurrence rule, each event exception including a reference to an event instance of the one or more event instances to be modified, a flag indicating which properties have been modified, an entry for each property that has been modified, a date stamp indicating when a modification was created, and a range flag indicating which event instance the modification applies;

identifying one or more event exceptions which have become stale when modifications specified by said one or more event exceptions have been obviated by modifications specified in one or more subsequently defined event exceptions; and, purging said identified one or more event exceptions.

10. The non-transitory machine readable storage medium of claim 9, further comprising the steps of:

identifying an event exception from the one or more event exceptions, the event exception corresponding to an event instance of the one or more event instances;

modifying at least one property of said event instance based upon said identified event exception;

further identifying an additional event exception from the one or more event exceptions, the additional event exception corresponding to said event instance; and, for the identified additional event exception, further modifying at least one property of said event instance based upon said the further identified additional event exceptions.

11. The non-transitory machine readable storage medium of claim 10, further comprising the step of repeating said identifying and modifying steps for additional ones of the event instances.

12. The non-transitory machine readable storage medium of claim 9, wherein the range flag indicating which event instance the modification applies indicates whether the modification applies to one of only the event instance of the one or more event instances, the event instance of the one or more event instances and all subsequent event instances, and the event instance of the one or more event instances and all previous event instances.

\* \* \* \* \*